United States Patent [19]
Canty

[11] Patent Number: 4,809,862
[45] Date of Patent: Mar. 7, 1989

[54] FUSEVIEW LAMINATE SAFETY SIGHT GLASS

[76] Inventor: Thomas M. Canty, 483 Fruitwood Ter., Williamsville, N.Y. 14221

[21] Appl. No.: 25,578

[22] Filed: Mar. 13, 1987

[51] Int. Cl.$^4$ .............................................. B65D 25/54
[52] U.S. Cl. .................... 220/82 A; 220/377; 116/276; 73/328
[58] Field of Search .................. 220/82 R, 82 A, 377; 73/323, 325, 326, 327, 328, 329, 339; 116/276

[56] References Cited

U.S. PATENT DOCUMENTS

| | | | |
|---|---|---|---|
| 3,307,400 | 3/1967 | LeRoy | 116/276 |
| 3,407,662 | 10/1968 | Torbox | 116/276 |
| 3,438,539 | 4/1969 | LeRoy | 220/337 |
| 3,625,390 | 12/1971 | Meginnis | 220/337 |
| 4,372,652 | 2/1983 | Pontefract | 73/328 |

Primary Examiner—Willis Little
Attorney, Agent, or Firm—James J. Ralabate

[57] ABSTRACT

A safety viewing window for observing the interior of a pressure vessel is the subject of this invention. This viewing window is made up of an optically clear window disc fused to a metal frame. A laminate is overcoated over the fused disc and frame to provide a corrosion resistant viewing window. The metal frame has attached to it brackets for securing the entire unit to the vessel in a pressure tight manner.

16 Claims, 1 Drawing Sheet

FUSEVIEW LAMINATE SAFETY SIGHT GLASS

This invention relates to pressure vessels and, more particularly, to a safety sight window.

BACKGROUND OF THE INVENTION

Various pressure vessels are used in several different industries including the metallurgical and chemical fields. Some of the known uses for these vessels include conducting chemical reactions under selective conditions of temperature and pressure, agitation of components, mixing of metals, etc. To determine progress of reactions or to view color changes, levels of components and the like, viewing windows are supplied in the exterior portions of these vessels. These viewing windows sometimes fail in service with serious results. Personnel in the vicinity of these windows can be seriously injured should the sight glass or window fail under the pressures used internally. In addition, failure of these windows could cause explosions and fires. Weakening of these windows can be caused (in addition to pressure) by the accidental impact of tools or fork lifts. Also, uneven glass loading due to uneven bolt or gasket stresses can cause cracking or failure of these windows. Another common cause of window failure is the corrosion of the gaskets or metal around the window caused by the harsh chemical environment during extended usage. There have been some attempts in the prior art to construct windows which have increased durability and safety, such as those disclosed in U.S. Pat. Nos. 2,744,487; 3,299,851; 3,837,226 and 4,245,566.

In U.S. Pat. No. 2,744,487 (Moore et al) a liquid sight glass is disclosed wherein a borosilicate glass is united by fusion with an eyelet or thimble. The two materials, i.e. borosilicate glass and thimble material, must have substantially equal coefficients of expansion. This is necessary because when these two parts are united by fusion any significant difference in coefficients of expansion would cause rupture of the glass due to unequal expansion. In seals of this type, especially when used in connection with corrosive liquids or gases, the peripheral parts of the structure are susceptible to corrosion over extended periods of use. Thus, even though the glass and thimble are hermetically fused, this does not avoid the potential of serious corrosion occuring.

Olsen, U.S. Pat. No. 3,299,851, discloses a sightglass construction wherein an adhesive is used to form a seal or bond between the glass and the flange of the ring containing the glass. A sealtight hardenable compound such as "Lock Tite" is applied on the flange where the glass is to be seated and upon hardening of this compound, a fluidtight seal is formed. The outer edge of the glass and the inner annular portion of the rim are sealed with the intent that the seal formed is resilient and will provide a cushion to allow greater pressure to be applied by the securing flange or rim to the glass to the seal. The use of only an adhesive to bond the glass to the metal frame has not been found to be suffcient to prevent rupturing and corrosion when used in high pressure vessels that are exposed to corrosive elements.

In U.S. Pat. No. 3,837,226 issued to Kawawa, a sight glass assembly is disclosed wherein the glass is formed directly in the retaining ring through melting of the glass and using the expansion and contractions to hold the glass in place. The glass is held in place by a reinforcing metal ring that is held in place by clamping frames and clamping bolts. Since the physical properties of the glass and metal are very different from each other, the glass plate and metal ring are bound together by thermal pre-stressing to provide a fluid-tight metal glass assembly.

Shimansky, U.S. Pat. No. 4,245,566, discloses a vacuum pressure chamber viewing port wherein a clear safety shield member spaced apart from the viewing port on the outer surface of the chamber is used. This safety shield is provided to protect the observer from flying debris resulting from a failure or explosion of the view port window. The safety shield is formed from Plexiglas, Lucite, or other shatter-resistant, optically clear materials.

While all of these prior art patents provide a degree of protection in connection with viewing ports for vacuum/pressure vessels, none of them have been found to provide adequate window failure protection because of pressure ruptures or corrosion.

SUMMARY OF THE INVENTION

It is therefore an object of this invention to provide a safety viewing window which is devoid of the above-noted disadvantages.

Another object of this invention is to provide a substantially safer and structurally sound viewing window for pressure equipment.

A further object of this invention is to provide a safety viewing window that is substantially corrosion resistant.

Yet another object of this invention is to provide a safety viewing window of increased strength and improved optics.

Still another object of this invention is to provide a safety viewing window that is relatively inexpensive compared to previously used windows of this type.

Yet still another object of this invention is to provide a safer viewing window adapted for use not only in pressure vessels but also in other enclosed vessels or environments, vacuum tanks and other means where a safe viewing window is required.

The foregoing objects and others are accomplished in accordance with this invention by providing a safety viewing window which comprises an outer frame or flange generally of metal having fused thereto a glass disc or optically clear polymeric window. Overcoating the frame and the disc window is a laminate that is substantially equally adhesively compatible with both the window and the frame. A difficulty encountered in this type of procedure is to be able to laminate the glass to the fused metal frame and fused window which have different adhesion and expansion characteristics.

The frame or flange can be made from any suitable material such as metals and plastics which have the required strength such as polycarbonates. However, for purposes of this invention, low carbon steel frames are preferred.

The window can be made from any suitable material such as inorganic glasses, acrylics, other polymeric materials, boron glass and other suitable optically clear materials. It is preferred, however, for purposes of this invention, that a substantially strong safety glass be used. The fuseview window is shown in this disclosure using a flange retainer. However a threaded retainer or integral threads on the fuseview window can be used to hold the fuseview in place. Specified pipe threaded, straight threaded o-ring sealed and sanitary tri-clamp designs will be applied in various industries.

The laminate which adheres to and overcoats both the frame and the viewing window can be made of inorganic glasses, acrylics, other polymeric materials, boron glass and other suitable optically clear materials.

The laminating process generally involves placing a glass plate or other suitable optically clear material over the fused window. The laminate is secured to the inner face of the window and frame by a preselected adhesive that will be compatible with both the window and frame, and yet not interfere with the optical clarity of the window and laminate. The adhesive used to secure the laminate was cyanoacrylate, but other suitable adhesives may be used such as suitable optically clear epoxies such as polyvinyl butyral. A high temperature laminate with a high shear strength is very important to this invention.

The laminated window of this invention provides the maximum strength and safety in a safety sight glass. It has a fused glass to metal seal cartridge that provides radial compression on the glass. The compression is maintenance free and much higher than mechanical compression, providing a stronger glass window. In addition, misadjustment of mechanical radial compression can cause failure. The sight glass of this invention provides an inside glass face laminated to the fuseview cartridge. The laminated face insures that only glass is exposed to the process. The glass face compresses the gasket against the mating surface and reduces the chance of bolt up or operating failure. The glass face only acts in compression. The laminated fuseview can be provided for higher pressure than shown. Laminated glass faces can be made of Pyrex, quartz, mica or other suitable materials. This allows for the best use of each material along with a design that uses both fusing and laminating for maximum safety.

DESCRIPTION OF DRAWING AND PREFERRED EMBODIMENTS

Figure 1:
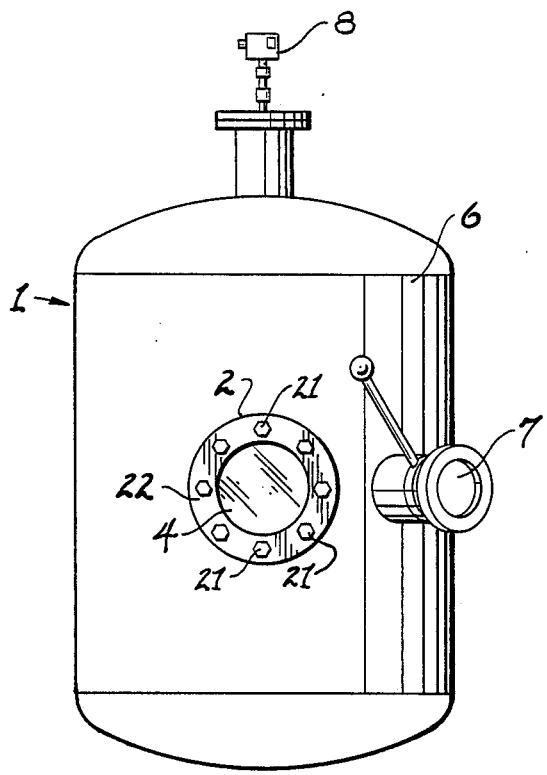
FIG. 1 is an illustration of the general type pressure equipment in which the viewing window of this invention is used.

In FIG. 1 a pressure vessel 1 is illustrated including the viewing window 2 of this invention. Window 2 comprises an annular outer ring brace 22 securing annular frame 3 in place (see FIG. 2) and having in its central portion a viewing window disc 4. The central viewing window disc 4 and the frame 3 are fused together by the process described later in this disclosure. A laminate is coated over the frame 3 and central window disc 4 as also described hereafter. Around the brace 22 are positioned bolts 5 tightened by nuts 21 which secure the brace 22 and frame 3 to tank portion 6. An opening port 7 is positioned in tank portion 6 to permit insertion and removal of materials to and from the interior of tank 6. A lighting source 8 is positioned in tank 6 to illuminate the interior of tank 6 so that the reaction or the like can be easily viewed through window or windows 2. Any number of windows 2 may be used in the pressure vessel 1.

Other elements can be alternately used in the pressure vessel 1 such as pressure vessel process camera for viewing instead of or together with a window, explosion-proof lighting for lighting as 8 except in hazardous areas, liquid level controllers for level indication and control, sight flow indicators for viewing liquid or material flowing in a pipeline, and a filtration canister for filtering solids and/or impurities out of gas or liquid. These are not shown in drawing since they are not necessary to describe the present invention.

Figure 2:
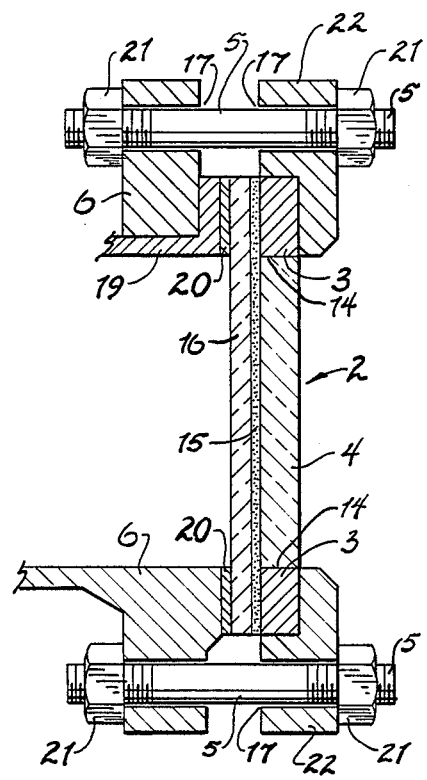
FIG. 2 is a side perspective view of the window of this invention.
Figure 3:
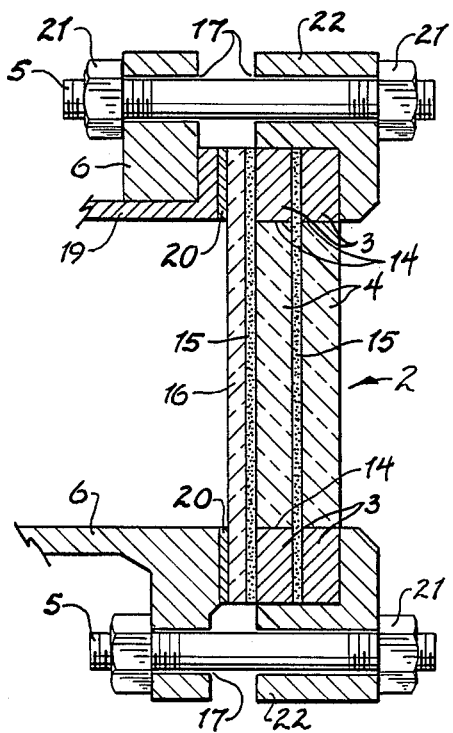
FIGS. 3 and 4 illustrate alternate embodiments of the invention.
Figure 4:
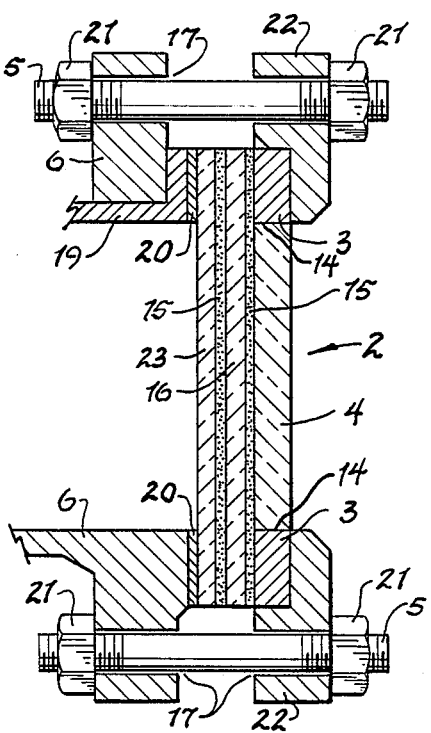

The frame 3 as shown in FIGS. 2, 3 and 4 of the viewing window is constructed of low carbon steel, generally having less than 10 percent carbon. A ¾ inch Sodaline or other suitable glass disc 4 is inserted snuggly within the inner peripheral portion 14 of ring frame 3 and fused therein by heating as described in known prior art literature cited hereafter. Alternately, a stainless steel frame can be fused to borosilicate glass. A glass adhesive 15 (of FIG. 2) matching the coefficient of expansion of the glass and metal is spread over the entire lateral surface of the fused frame 3, inner window 4 of viewing window 2.

In FIG. 2 a side cutaway view of the viewing window 2 is illustrated. The carbon steel metal frame 3 has fused within its inner peripheral portion 14 a glass disc or central window 4. As noted earlier, this disc 4 is fused to impart increased strength to the entire window structure 2. The specific frame 3 used was obtained forged to the ASME Code and is carbon steel or stainless and can have an inner diameter of about four inches. Obviously, any size frame or flange 3 and disc 4 may be used depending upon the desired size window and size vessel. A suitable adhesive such as an optically clear epoxy resin adhesive 15 is spread across the inner entire surface of the fused glass disc 4 and frame 3 and a glass laminate 16 is adhered thereto. The glass laminate 16 further enhances the strength of the overall structure while not interferring with the viewing qualities of the central window 2. Bolts 5 extend through apertures 17 in the flange or brace 22 for attachment of the window unit 2 to tank 6. Nuts 21 are tightened over bolts 5 to secure the unit to tank 6 or bracket 19 and brace 22. In FIG. 2 the window unit can be attached to tank 6 in various ways such as directly to raised tank portion 6 or by use of inverted L-shaped bracket 19 which in turn is connected to tank 6. Between each of these structures is located a gasket 20 to protect the metal to glass interface. When bracket 19 is used, it is attached to tank portion 6 by any suitable means such as welding.

The nature of the adhesive 15 will depend upon the material of the disc 4 and, of course, the composition of the frame 3. If, for example, the disc 4 is glass, the adhesive 15 most likely will be a glass-compatible composition. If the composition of the disc 4 is a clear plastic such as polycarbonates or acrylic, most likely the adhesive 15 will be a plastic-compatible composition. Since the requirements of clarity and visibility are critical to a window of this type, it is important that all elements of this invention including the disc 4, adhesive 15, and laminate sheet 16 not diminish those requirements. Therefore, they must be carefully selected not only because of their individual properties but also so that they not exhibit adverse visual properties when combined with the other elements. Examples of potential problems with the wrong components 4, 15 and 16 are clouding, crazing or cracking. The adhesive 15, for example, must be relatively chemically inert to the elements it contacts. If the adhesive would react with the disc 4 or frame 3 or laminate 16, it could in time obstruct the clarity of the window unit 2.

In FIG. 3, two central window discs 4 are used to impart additional strength to the structure. Thus, two windows 4 are used together with a single laminate 16. As in the embodiment of FIG. 2, an adhesive 15 is applied to the bottom face of the bottom window disc 4 before positioning laminate 16 thereon. With the exception of the double window discs 4, all other features as shown in FIG. 2 remain the same in the embodiment of FIG. 3. The window discs 4 can be of the same or different materials providing they are optically clear and thus do not interfere with visibility. Both are fused to the inner circumference of annular frames 3 to secure and enhance the strength of the unit.

In FIG. 4 the same unit as in FIG. 2 is illustrated except the embodiment of FIG. 4 has two laminates 16. The inner laminate 16 is fixed by adhesive 15 to the frame 3 and glass (or other material) window disc 4 and the bottom or outer laminate 23 is fixed by adhesive to inner laminate 16. The use of two laminates 16 and 23 could provide double protection from corrosion and rupture, thus in high pressure vessels where the internal presssure far exceeds the atmospheric pressure, a double laminate structure may be preferred. The laminated window of this invention provides the maximum strength and safety in a safety sight glass. It has a fused glass to metal seal cartridge that provides radial compression on the glass. The compression is maintenance free and much higher than mechanical compression, providing a stronger glass window. In addition, misadjustment of mechanical radial compression can cause failure. The view glass 2 of this invention provides an inside glass face laminated to the fuseview cartridge. The laminated face insures that only glass or other outer laminate is exposed to the process, conditions and materials. The outer laminate 23 compresses the gasket 20 against the mating surface and reduces the chance of bolt up or operating failure. The glass face only acts in compression. The laminated unit can be provided for any pressure desired. Laminated glass faces can be made of Pyrex, quartz, mica or other materials to suit the desired application. This allows for the best use of each material along with a design that uses both fusing and laminating for maximum safety.

It is important to the present invention that the frame 3 and window disc 4 be properly fused for maximum strength. Fusing is the process of bonding glass and metal together. The basic requirements to make a glass-metal seal are:

(A) The glass should wet and adhere to the metal.

(B) The linear expansion of the glass must match closely that of the metal. A compression seal is used in this invention where the metal has a higher expansion than the glass. The glass disc is inserted into the metal ring with a maximum tolerance of 0.008 inch. The glass flows rapidly when heated above 1400° F. and adheres to the metal. On cooling, the glass is highly compressed since the thermal expansion of the metal is higher. This compression gives the same benefit as pre-stressing concrete. (The ability to take bending/tensile stress.)

(C) It is important that there be no thermal critical points in the metal (allotropic transformations) within the sealing temperature range (maximum 1100° C.).

(D) The metal must be degassed at 1100° C. in order to outgas prior to sealing. Outgassing during sealing should be avoided since it causes bubbles which cause a weaker seal.

(E) Fusing should occur in a manner whereby the glass shall not boil at the fusing point.

Generally, in the present invention, a low carbon steel metal ring or frame and glass disc are machined to within 0.008 inch tolerance. The metal is degassed at 1100° C. under reducing hydrogen atmosphere (15% $H_2$ by volume). The metal ring and the glass disc are then assembled on a carbon plate since carbon will not wet to the glass. The metal ring is then fused to the glass disc at 900° C. in a slightly reducing atmosphere (3-7% $H_2$). The resulting end product is then nickel plated around the metallic portion for further corrosion resistance.

The fusing process followed in the present invention is similar to that process described in *Glass Engineering Handbook*, Third Edition, Chapter 5, 1984 Library of Congress #ISBN 0-07-044823-X by G. W. McLellan and E. B. Shand. Laminating is disclosed in this same book, pages 12-15, all of which are hereby incorporated by reference in the present disclosure.

The preferred and optimumly preferred embodiments of the present invention have been described herein and shown in the accompanying drawing to illustrate the underlying principles of the invention, but it is to be understood that numerous modifications and ramifications may be made without departing from the spirit and scope of this invention.

What is claimed is:

1. A safety viewing window adapted for use on a pressure vessel comprising a flange, a substantially visibly clear window disc, a laminate and a frame, said frame enclosing said window disc and being fused thereto, said laminate secured with an adhesive over substantially the entire lateral surface of said viewing window and overcoating said fused frame and window disc, said laminate covering substantially the entire adhesive portion of said viewing window including said fused and viewing window, said adhesive located between said lateral surface and said laminate.

2. The viewing window of claim 1 wherein attachement bolts extend through its peripheral portion and wherein said bolts are adapted to connect said viewing window to a side of a pressure vessel.

3. The viewing window of claim 1 wherein both said window disc and said laminate are made of an inorganic glass composition.

4. The viewing window of claim 1 wherein said frame is constructed of a metallic material.

5. The viewing window of claim 1 wherein said frame is constructed of a low carbon steel.

6. The safety viewing window of claim 1, wherein said adhesive is an epoxy material.

7. The safety viewing window of claim 1 wherein said frame is of an annular configuration and said window disc has a circumference just slightly smaller than the inner circumference of said annular frame and fits tightly therein, said disc being fused to said inner circumference of said frame.

8. A safety viewing window adapted for use on a pressure vessel which comprises an outer frame means, at least one viewing window means, an adhesive, and at least one laminate, said viewing window means completely encompassed by said and fused thereto, said laminate overcoating and coextensive with at least one complete face of said frame and encompassed viewing window, positioned between said laminate and said complete face of said frame and viewing window is said adhesive, said adhesive being substantially non-reactive with any components it is in contact with, said frame containing a plurality of apertures through which attachement bolts are housed, said bolts adapted to connect said safety viewing window to a pressure vessel.

9. The viewing window of claim 8 wherein both said window disc and said laminate are made of an inorganic glass composition.

10. The viewing window of claim 8 wherein said frame is constructed of a metallic material.

11. The viewing window of claim 8 wherein said frame is constructed of a low carbon steel.

12. The safety viewing window of claim 8 wherein said adhesive is an epoxy adhesive.

13. The safety viewing window of claim 8 wherein said frame is of an annular configuration and said window disc has a circumference just slightly smaller than the inner circumference of said annular frame and fits tightly therein, said disc being fused to said inner circumference of said frame.

14. The safety viewing window of claim 8 wherein said laminate is the only window portion in contact with the vessel contents and vessel environment.

15. The safety viewing window of claim 8 wherein more than one window disc is used.

16. The safety viewing window of claim 8 wherein more than one laminate is used.

* * * * *

UNITED STATES PATENT AND TRADEMARK OFFICE
CERTIFICATE OF CORRECTION

PATENT NO. : 4,809,862

DATED : March 7, 1989

INVENTOR(S) : Thomas M. Canty

It is certified that error appears in the above-identified patent and that said Letters Patent is hereby corrected as shown below:

In the Claims, Claim 8 should read as follows:

-8-

A safety viewing window adapted for use on a pressure vessel which comprises an outer frame means, at least one viewing window means, an adhesive, and at least one laminate, said viewing window means completely encompassed by said frame means and fused thereto, said laminate overcoating and coextensive with at least one complete face of said frame and encompassed viewing window, positioned between said laminate and said complete face of said frame and viewing window is said adhesive, said adhesive being substantially non-reactive with any components it is in contact with, said frame containing a plurality of apertures through which attachment bolts are housed,

UNITED STATES PATENT AND TRADEMARK OFFICE
CERTIFICATE OF CORRECTION

PATENT NO. : 4,809,862

DATED : March 7, 1989

INVENTOR(S) : Thomas M. Canty

It is certified that error appears in the above-identified patent and that said Letters Patent is hereby corrected as shown below:

said bolts adapted to connect said safety viewing window to a pressure vessel.

Signed and Sealed this

Twentieth Day of February, 1990

*Attest:*

JEFFREY M. SAMUELS

*Attesting Officer*     *Acting Commissioner of Patents and Trademarks*